United States Patent [19]

Hogg

[11] Patent Number: 4,647,933
[45] Date of Patent: Mar. 3, 1987

[54] PHASED ANTENNA ARRAY FOR WIND PROFILING APPLICATIONS

[75] Inventor: David C. Hogg, Boulder, Colo.

[73] Assignee: The United States of America as represented by the Secretary of Commerce, Washington, D.C.

[21] Appl. No.: 666,594

[22] Filed: Oct. 31, 1984

[51] Int. Cl.[4] .............................................. G01S 13/95
[52] U.S. Cl. ..................................................... 342/26
[58] Field of Search .................. 343/5 W, 792.5, 797, 343/798, 815, 816, 817; 73/170 R, 188, 189

[56] References Cited

U.S. PATENT DOCUMENTS 3,790,950  2/1974  Smith et al. ..................... 343/792.5

Primary Examiner—Thomas H. Tarcza
Assistant Examiner—Donald E. Hayes, Jr.
Attorney, Agent, or Firm—Eugene J. Pawlikowski; Alvin J. Englert; William M. Wannisky

[57] ABSTRACT

A diagonal phased antenna array for use as a wind profiler by means of Doppler shift measurements comprises a plurality of Yagi-Uda antennas which are oriented in a predetermined direction such that Yagi-Uda antennas have a polarization 45° offset from the principal planes of operation of the antenna array resulting in similar radiation patterns subject to a geometric taper in the array aperture with respect to the principal planes.

1 Claim, 11 Drawing Figures

PHASED ANTENNA ARRAY FOR WIND PROFILING APPLICATIONS

BACKGROUND OF THE INVENTION

1. Field of the Invention

The invention relates to a phased antenna array for use with radar apparatus for wind profiling based on Doppler frequency shift measurements. More specifically, the invention relates to a diagonally-shaped or diamond-shaped, phased array of individual antenna elements oriented to be uniformly polarized in a predetermined direction which is at a 45° angle to the principal planes of the array such that the radiation patterns are similar and geometrically tapered in the principal planes.

2. Description of the Prior Art

It is known that measurements of Doppler frequency shifts using radar equipment may be used to determine the direction, velocity and altitude of winds. This practice is referred to as "wind profiling". By using an antenna array having radiation pattern characteristics which are identical in two orthogonal planes, it is possible to measure the horizontal wind components in the two planes, e.g., in the north-south and east-west directions. The antenna array is connected to a conventional radar apparatus comprising a transmitter and receiver. A pulse stream is transmitted and then reflected by a refractive air mass that is moving with the wind. The movement by the wind creates a Doppler frequency shift in the reflected pulses causing the received signal to differ in frequency from the transmitted signal. Using conventional computational equipment and techniques, the frequency shift is used to calculate wind speed. The wind components received by the radar apparatus are used to form vectors which when added, give the wind direction and speed. By appropriately gating the receiver to allow the pulses to have different round trip times, i.e. the time from transmission, reflection and reception, the wind components at various heights can be determined.

A sensing system for profiling the troposphere is discussed in "An Automatic Profiler of the Temperature, Wind and Humidity in the Troposphere", by D. C. Hogg et al, Journal of Applied Meteorology, Volume 22, No. 5, pages 807-31, May 1983. At pages 815 through 822 of the above-referenced paper, an antenna for use in radar measurement of winds and inversion heights is described. The antenna comprises 32 rows of dipoles spaced at λ/2. The dipoles are constructed from coaxial cables supported on posts about λ/4 above the ground plane. The dipoles are made by interchanging the inner and outer conductors of the coaxial cable every λ/2 and are fed at the center of each row dipoles. The antenna array has beams off zenith directed north, and east. A separate antenna array is used to produce a beam pointed directly at zenith to measure vertical winds. The rows of dipoles are in-phase for the zenith pointing beam and are shifted row-to-row by changing the length of feed lines to generate the beams pointing off zenith.

SUMMARY OF THE INVENTION

The invention relates to a geometrically tapered, diagonal antenna array for use in wind profiling.

It is an object of the invention to provide a diagonal-shaped or diamond-shaped, phased antenna array phased such that the beams of the array are providing sequentially in the north and east directions, 15° off zenith for measuring the north and east components of winds.

It is a further object of the invention to provide an antenna array such that the radiation patterns of the array in the north-south and east-west planes are identical.

It is a yet further object of the invention to provide an antenna array having a geometrical tapered illumination pattern with respect to its principal planes of operation.

It is yet another object of the invention to provide an antenna array for wind profiling applications which is simple, reliable and inexpensive to construct, operate and maintain.

These and other objects of the invention will be readily apparent to one having ordinary skill in the art from the following description taken in connection with the drawings.

DESCRIPTION OF THE PREFERRED EMBODIMENT

Figure 1:
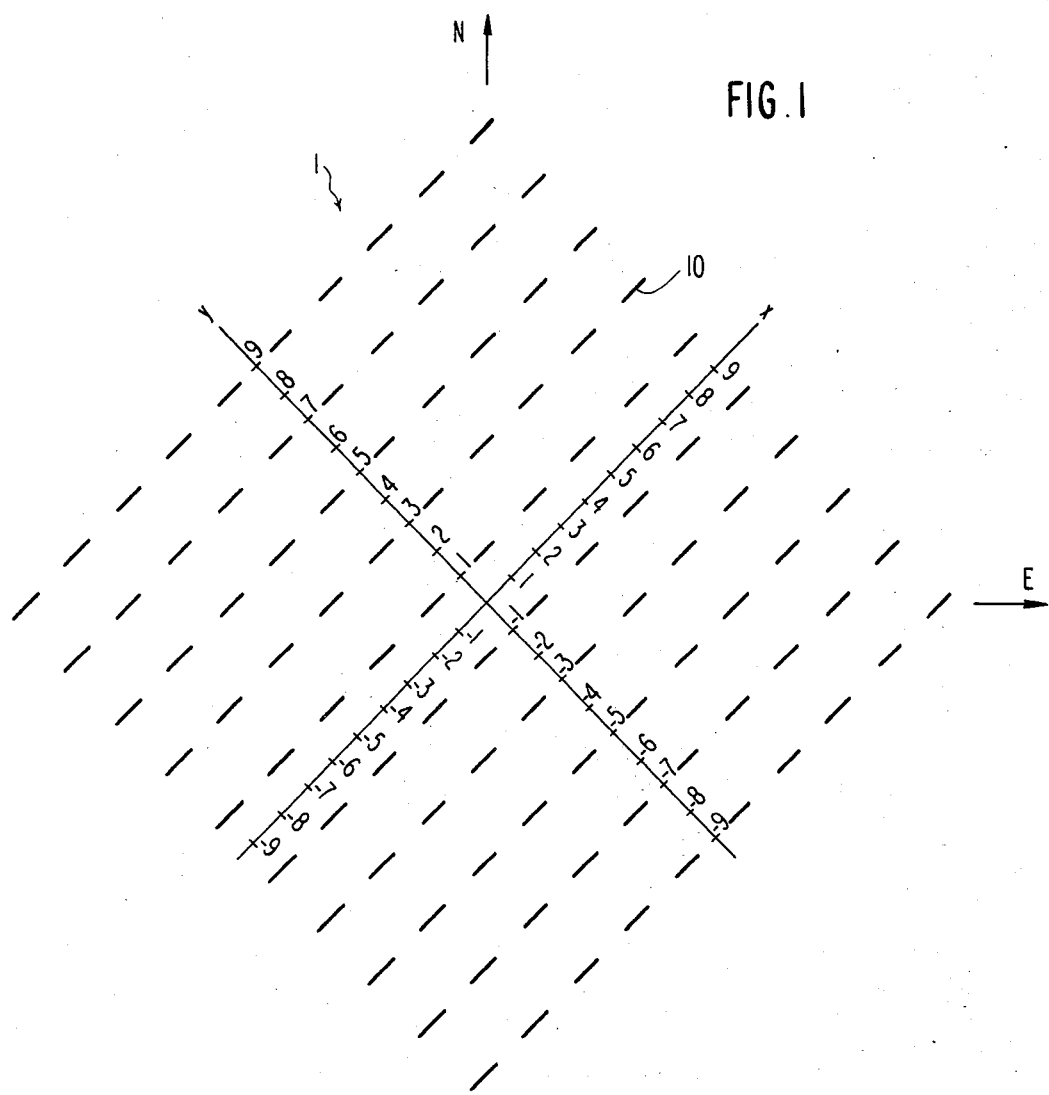
FIG. 1 shows a schematic plan view of a phased antenna array according to the present invention.

FIG. 1 schematically illustrates a plan view of an antenna array 1 according to the present invention comprising 100 individual antenna elements which are Yagi-Uda (hereinafter Yagi) type antennas, one of which is shown at 10. The Yagi antennas are identical. The x-y coordinates are provided for spatial reference purposes to identify the location of the individual antennas.

Figure 2:
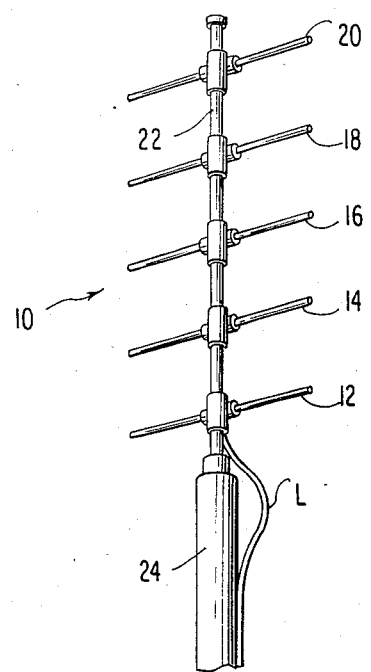
FIG. 2 shows a typical Yagi antenna suitable for use in implementing the phased antenna array of FIG. 1.

FIG. 2 shows one type of Yagi antenna suitable for use with the present invention. Yagi antennas inherently have different radiation patterns in the plane of polarization, the E plane and in the orthogonal, H plane. In other words, they have different beam widths in the parallel plane and in the orthogonal plane relative to the direction of polarization of the antenna components. In actuality, it is not necessary to use a Yagi-type antenna to practice the invention. Other antenna types such as horn antennas, may be used but may not be practical from a cost standpoint. In FIG. 2, the numeral 10 again refers to an individual Yagi antenna element as referred to in connection with FIG. 1. Numeral 12 shows a driven element, numeral 14 a reflector element and numerals 16, 18 and 20 show director elements. The reflectors and directors are excited parasitically. They pick up energy from the driven element and re-radiate it in a phase to reinforce the energy radiated by the driven element in the direction of the directors 16, 18 and 20.

The antenna elements are mounted on a tube 22 or similar structure which is in turn is secured to a mast 24. A feed line L comprising a coaxial cable connects the Yagi driven antenna element to the other components of the wind profiling apparatus. Only the driven element is connected to the end of the feed line L.

Returning to FIG. 1, the antenna array is seen to be diagonally aligned with the north-south, east-west directions, i.e., the principal planes, resulting in a diamond-shaped relationship relative to those planes. The individual Yagi antennas, however, are aligned in the northeast-southwest directions or 45° from the principal planes. Since the radiation pattern of the Yagi antenna is then identical in the two principal planes, the radiation and polarization characteristics of the array in the north-south and east-west planes will be identical provided the phases of the individual Yagis are chosen with the desired symmetry for producing a beam in the north-south plane, followed by one in the east-west plane. This is a very desirable factor in wind profiling applications.

The number of individual antenna elements used in the antenna array is based primarily on two considerations. First, the desired amount of gain or sensitivity and beam width must be selected; this will determine the aperture size or the area of the antenna. An aperture size of 100 square wavelengths will result in a beam width of 3°-5°. In order to insure that the beam provides proper Doppler shift when directed off zenith it is necessary that the beamwidth be small relative to the zenith offset angle. Second, the number of individual antenna elements is determined as a function of cost and available spacing within the antenna array area. As more antenna elements are used, the interelement spacing will become closer producing less bothersome grating lobes off the beam axis and resulting in improved antenna array performance. However, if the antenna elements are too close to each other, undesirable interaction between neighboring antenna elements may result.

The area of the antenna array for the embodiment described herein is approximately 130 $\lambda^2$. For operation at 400 MHz, the wavelength, $\lambda$, is equal to 75 centimeters. Other frequencies may also be used provided that its associated wavelength is matched to the individual antenna elements forming the antenna array. Consequently, the area of a typical array according to the present invention is equal to $130\times(0.75)^2$ or approximately 73 square meters. The array wil be approximately 8.55 meters on a side. The Yagis are evenly spaced with ten Yagis per side such that the inter-element, center-to-center spacing is about 33.6 inches. For such an array, operational at 400 MHz with 25 kilowatts of peak power, each Yagi antenna would receive 100th of the transmitted power or 250 watts.

Since the antenna array is diamond-shaped in the principal planes, it produces a "geometrically tapered" illumination pattern in those planes. The geometrical taper automatically determines the radiation patterns. With the tapered pattern, maximum power is provided in the center of the antenna array. Towards the edges of the antenna array where there are relatively few individual antenna elements, the power level decreases; this is true even if all the elements are fed with equal power. To get desirable low side lobes, it is necessary to distribute the radiated power with maximum power in the center of the antenna array. This geometrical taper feature, inherent in the effective illumination, results in immediate side lobes that are more than 26 dB (1/400) below the main beam on-axis radiation, as compared with $-13$ dB for an aperture with untapered radiation. Low side lobes reduce the effects of noise and ground "clutter" on the array.

Since it would be impossible to detect any Doppler frequency shift if the transmitted beam were oriented orthogonally to the horizontal wind direction, it is necessary to tilt the beam to some degree. Errors attributable to horizontal gradients are minimized using a high elevation angle. Practice has demonstrated that tilting the beam 15° from the zenith produces good results. The phasing required to achieve the desired beam direction now will be discussed.

Figure 3:
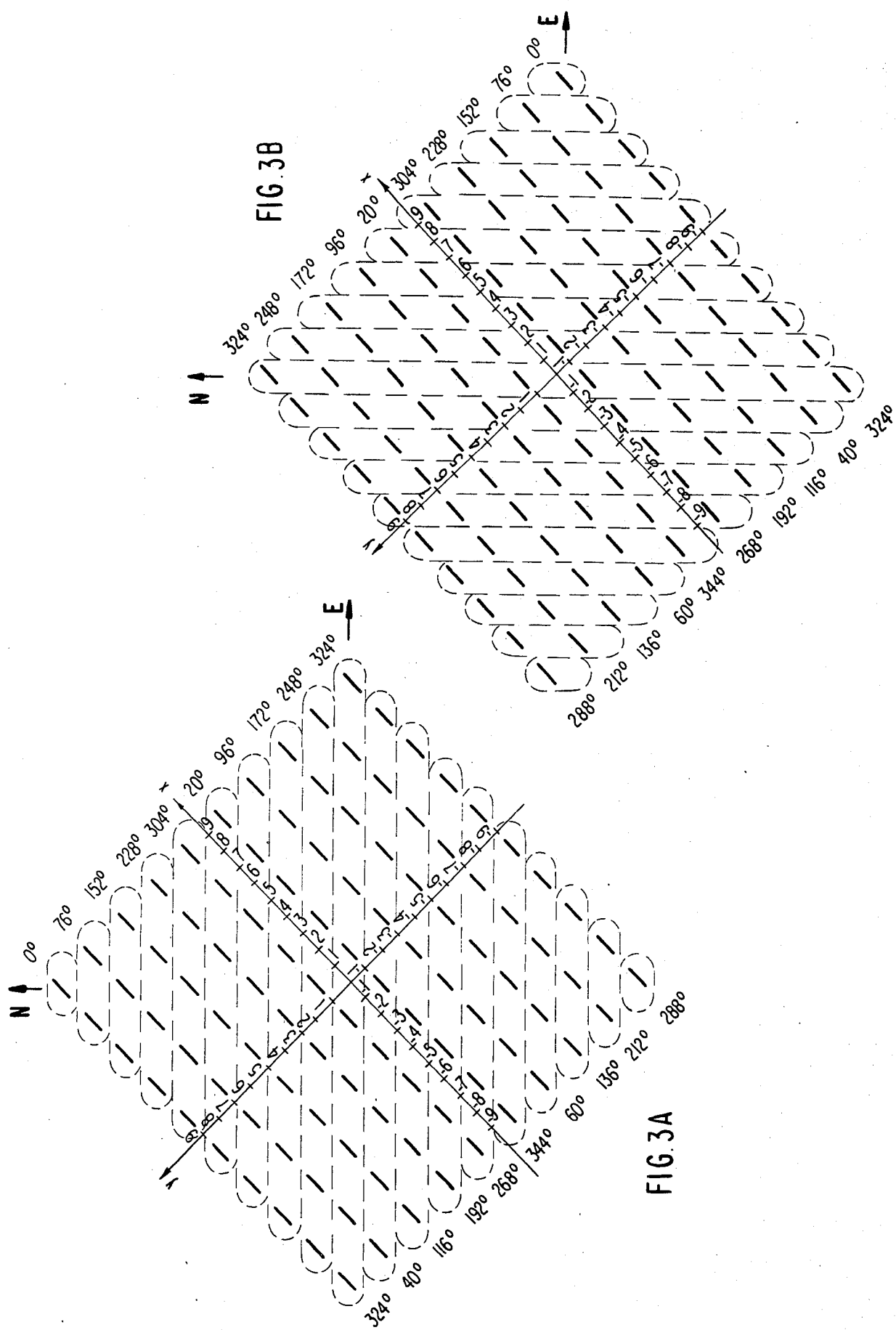
FIGS. 3a and 3b show the phasing arrangements to achieve beam direction in the north direction 15° off zenith and in the east direction 15° off zenith using the present invention.
Figure 6:
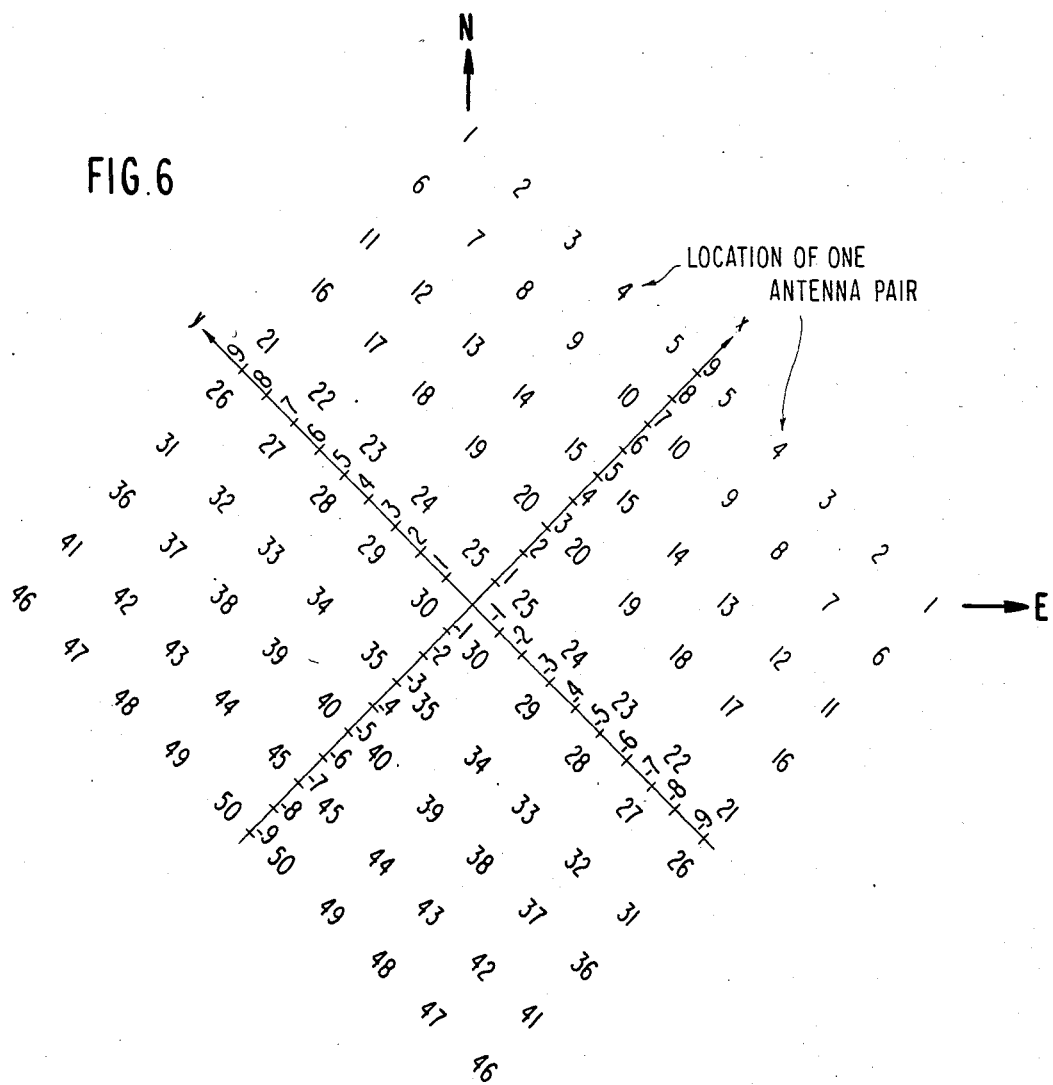
FIG. 6 shows a topological layout of paired individual antenna elements for connection to the transfer switches.

FIGS. 3a and 3b show the antenna array phasing. It is seen that the individual antenna elements are organized into 19 groups, each of which is separated by 76° from any adjacent group(s). The antennas in each group are all in phase with each other. FIG. 3a shows the phasing when it is desired to direct the main beam of the antenna in the north direction. FIG. 3b shows the phasing when it is desired to direct the main beam of the antenna in the east direction. In both cases, the Yagi elements are grouped into 19 different phases where successive phases are separated by 76°. The phasing is exactly the same for both directions except it is shifted geometrically by 90° for the north and east beams. FIG. 6 and Table 1 discussed hereinbelow show the phasing assignments for all the individual antenna elements. With the Yagi antenna elements phased as shown in FIGS. 3a and 3b, the main beam of the antenna can be steered alternately in the north direction at 15° off zenith and in the east direction at 15° off zenith.

Figure 4:
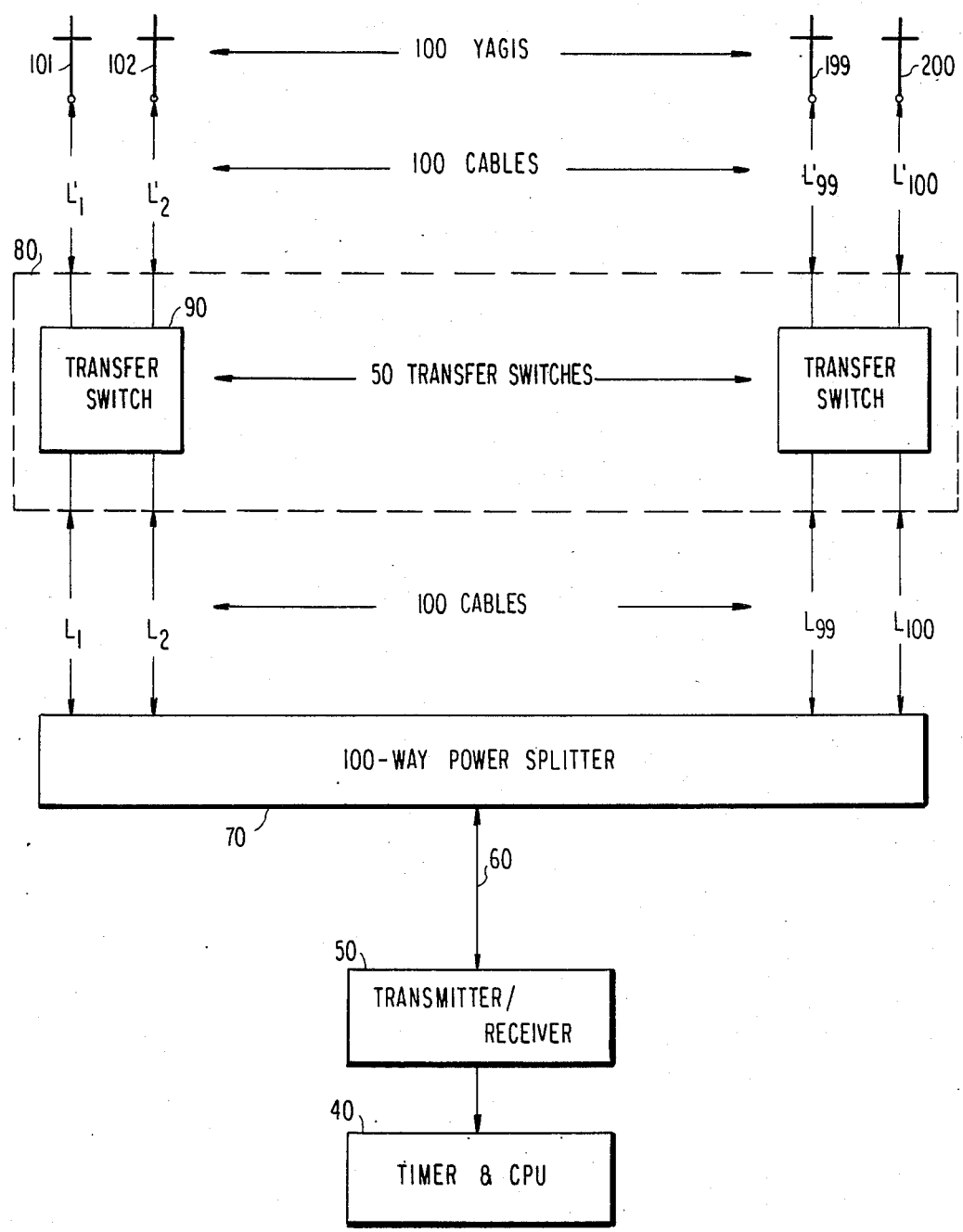
FIG. 4 shows a wind profiling apparatus.

FIG. 4 schematically depicts the feed structure connecting the Yagi antennas to the wind profiling apparatus. During the transmission mode, power from the transmitter/receiver 50 transmitter is provided on line 60 to power splitter 70. The power splitter separates the transmitter power into 100 outputs, equal to amplitude and phase. During reception, the splitter combines the signal received by each Yagi antenna into a single signal. The power splitter is a reactive coaxial design wherein the input signal is split four times. The next split takes the four signals and splits each one 25 times more. Thus, the power splitter comprises a single 1:4 splitter and four 1:25 splitters. For reception, the power splitter acts as a combiner to add the signals from the individual antennas into one signal. The 100 equal phase and amplitude outputs are connected by coaxial cables $L_1$ through $L_{100}$ to a bank 80 of 50 transfer switches, one of which is shown at 90.

Coaxial cables $L_1$ through $L_{100}$ are sized to achieve the desired phase difference necessary to phase the antenna array and point the beam in the proper directions. As mentioned above in connection with FIGS. 3a and 3b, the preferred embodiment uses 19 different groups which are required to achieve proper phasing resulting in a phase difference of approximately 76° between adjacent individual antenna element groupings. This requires 19 different phase angles which are effected by setting the appropriate cables $L_1$ through $L_{100}$ to the requisite lengths to obtain the desired phase angles.

The output of the bank 80 of transfer switches are connected by coaxial cables $L'_1$ through $L'_{100}$ to individual Yagi antennas 101 through 200. In the preferred embodiment, these cables are all equal in length. Equal length cables are used for wideband applications. However, these cables may also be in multiple wavelengths where the wavelength=75/$\epsilon_r$ centimeters and $\epsilon_r$ is the dielectric constant of the cable. Depending on the bandwidth desired, any number of different cable lengths may be used provided they all are multiples of the operating wavelength in the cable.

Although the type of coaxial cable used is not critical, it must be flexible, have low loss and have a stable phase characteristic over the expected ambient temperature range.

The power splitter, transfer switches and phase shifting cables are contained in a weather-tight housing which is located in the center of the antenna array.

The output of the receiver portion of the transmitter-receiver 50 is connected to CPU 40 which includes means for measuring the elapsed time between when a pulse is transmitted and when it is received for each beam direction. A computer or CPU is programmed to calculate wind direction and speed profiles by adding the vectors measured in both beams.

Figure 5:
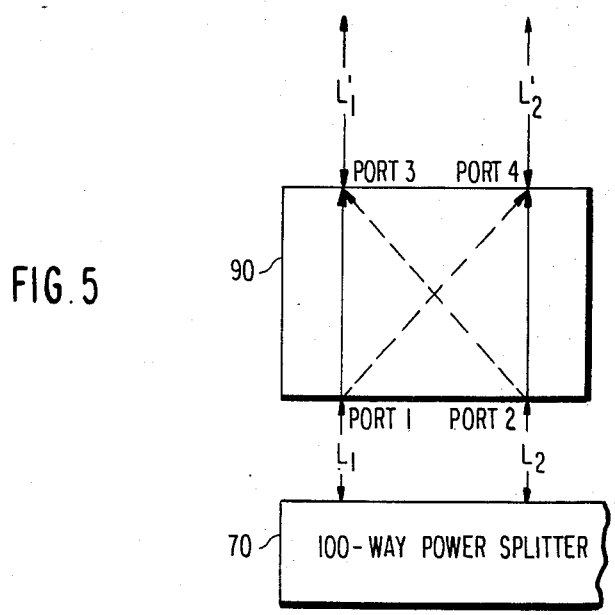
FIG. 5 shows a transfer switch for interconnection with the individual antenna elements and the power splitter used in wind profiling apparatus.

FIG. 5 schematically illustrates a transfer switch depicted by numeral 90 in FIG. 4. This type of switch has two positions for each port, i.e., port 1 may be connected either to port 3 or port 4. Similarly, port 2 may be connected either to port 3 or 4. Port 1 and port 2 may not be connected to each other or to any other port simultaneously. The solid lines depict a "switch on" position, while the dashed lines depict a "switch off" position. When all the switches are off, the beam will be pointed in the north direction, 15° off zenith and when all the switches are on, the beam will be pointed in the east direction 15° off zenith.

FIG. 6 shows an antenna array with the numerals 1 through 50 inserted at the locations of the individual antenna elements. It will be seen that each numeral is used twice indicating an antenna element pair. Each antenna pair is connected to a transfer switch which controls the phase of the individual antenna elements.

Table 1 shows how the phasing of the individual antenna elements shown in FIGS. 3a and 3b may be achieved by connecting the commonly numbered antenna element pairs shown in FIG. 6.

TABLE 1

| Antenna Location (x,y) | Connection # | Antenna Phasing Relative Phase w/Switch On + ° | Relative Phase w/Switch Off + ° |
|---|---|---|---|
| 9, 9 | 1 | 0 | 324 |
| 9,−9 | 2 | 324 | 0 |
| 9, 7 | 3 | 76 | 248 |
| 9,−7 | 4 | 248 | 76 |
| 9, 5 | 5 | 152 | 172 |
| 9,−5 | 6 | 172 | 152 |
| 9,3 | 7 | 228 | 96 |
| 9,−3 | 8 | 96 | 228 |
| 9,−3 | 8 | 96 | 228 |
| 9,1 | 9 | 304 | 20 |
| 9,−1 | 10 | 20 | 304 |
| 7,9 | 11 | 76 | 40 |
| 7,−9 | 12 | 40 | 76 |
| 7,7 | 13 | 152 | 324 |
| 7,−7 | 14 | 324 | 152 |
| 7,5 | 15 | 228 | 248 |
| 7,−5 | 16 | 248 | 228 |
| 7, 3 | 17 | 304 | 172 |
| 7,−3 | 18 | 172 | 304 |
| 7,1 | 19 | 20 | 96 |
| 7,−1 | 20 | 96 | 20 |
| 5,9 | 21 | 152 | 116 |
| 5,−9 | 22 | 116 | 152 |
| 5,7 | 23 | 228 | 40 |
| 5,−7 | 24 | 40 | 228 |

TABLE 1-continued

| Antenna Location (x,y) | Connection # | Antenna Phasing Relative Phase w/Switch On + ° | Relative Phase w/Switch Off + ° |
|---|---|---|---|
| 5,5 | 25 | 304 | 324 |
| 5,−5 | 26 | 324 | 304 |
| 5,3 | 27 | 20 | 248 |
| 5,−3 | 28 | 248 | 20 |
| 5,1 | 29 | 96 | 172 |
| 5,−1 | 30 | 172 | 96 |
| 3,9 | 31 | 228 | 192 |
| 3,−9 | 32 | 192 | 228 |
| 3,7 | 33 | 304 | 116 |
| 3,−7 | 34 | 116 | 304 |
| 3,5 | 35 | 20 | 40 |
| 3,−5 | 36 | 40 | 20 |
| 3,3 | 37 | 96 | 324 |
| 3,−3 | 38 | 324 | 96 |
| 3,1 | 39 | 172 | 248 |
| 3,−1 | 40 | 248 | 172 |
| 1,9 | 41 | 304 | 268 |
| 1,−9 | 42 | 268 | 304 |
| 1,7 | 43 | 20 | 192 |
| 1,−7 | 44 | 192 | 20 |
| 1,5 | 45 | 96 | 116 |
| 1,−5 | 46 | 116 | 96 |
| 1,3 | 47 | 172 | 40 |
| 1,−3 | 48 | 40 | 172 |
| 1,1 | 49 | 248 | 324 |
| 1,−1 | 50 | 324 | 248 |
| −1,9 | 51 | 20 | 344 |
| −1,−9 | 52 | 344 | 20 |
| −1,7 | 53 | 46 | 268 |
| −1,−7 | 54 | 268 | 96 |
| −1,5 | 55 | 172 | 192 |
| −1,−5 | 56 | 192 | 172 |
| −1,3 | 57 | 248 | 116 |
| −1,−3 | 58 | 116 | 248 |
| −1,1 | 59 | 324 | 40 |
| −1,−1 | 60 | 40 | 324 |
| −3,9 | 61 | 96 | 60 |
| −3,−9 | 62 | 60 | 96 |
| −3,7 | 63 | 172 | 344 |
| −3,−7 | 64 | 344 | 172 |
| −3,5 | 65 | 248 | 268 |
| −3,−5 | 66 | 268 | 348 |
| −3,3 | 67 | 324 | 192 |
| −3,−3 | 68 | 192 | 324 |
| −3,1 | 69 | 40 | 116 |
| −3,−1 | 70 | 116 | 40 |
| −5,9 | 71 | 172 | 132 |
| −5,−9 | 72 | 136 | 172 |
| −5,7 | 73 | 248 | 60 |
| −5,−7 | 74 | 60 | 248 |
| −5,5 | 75 | 324 | 344 |
| −5,−5 | 76 | 344 | 324 |
| −5,3 | 77 | 40 | 268 |
| −5,−3 | 78 | 268 | 40 |
| −5,−1 | 79 | 116 | 192 |
| −5,−1 | 80 | 192 | 116 |
| −7,9 | 81 | 248 | 212 |
| −7,−9 | 82 | 212 | 248 |
| −7,7 | 83 | 324 | 136 |
| −7,7 | 84 | 136 | 324 |
| −7,5 | 85 | 40 | 60 |
| −7,3 | 87 | 116 | 334 |
| −7,−3 | 88 | 344 | 116 |
| −7,1 | 89 | 192 | 268 |
| −7,−1 | 90 | 268 | 192 |
| −9,9 | 91 | 324 | 288 |
| −9,−9 | 92 | 288 | 324 |
| −9,7 | 93 | 40 | 212 |
| −9,−7 | 94 | 212 | 40 |
| −9,5 | 95 | 116 | 136 |
| −9,−5 | 96 | 136 | 116 |
| −9,3 | 97 | 192 | 60 |
| −9,−3 | 98 | 60 | 192 |
| −9,1 | 99 | 268 | 344 |
| −9,−1 | 100 | 344 | 268 |

In operation, the transmitter portion of the transmitter-receiver typically will provide a burst of pulses at 400 MHz for several microseconds to the antenna array. The transmitter is pulsed at approximately a 1 KHz rate. As a result of the wind, the received pulse will be frequency shifted approximately several hundred Hertz. The receiver is gated to determine the height at which the energy was reflected. This gating simply is done to allow longer round trip times in order to get reflections from points high in the atmosphere. The received information is processed using readily available algorithms to generate wind direction, speed and altitude information.

Figure 7A:
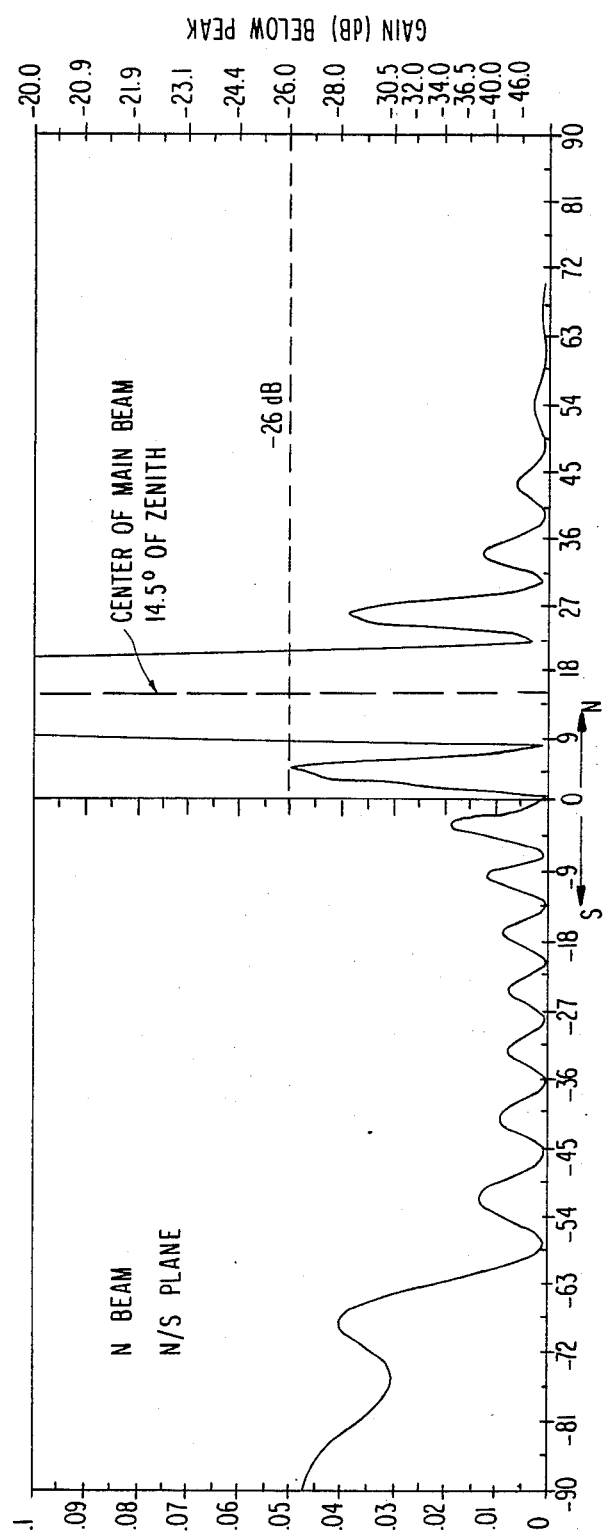
FIGS. 7a through 7d show radiation patterns for a beam directed to the north which were generated using a preferred embodiment of the present invention.
Figure 7B:
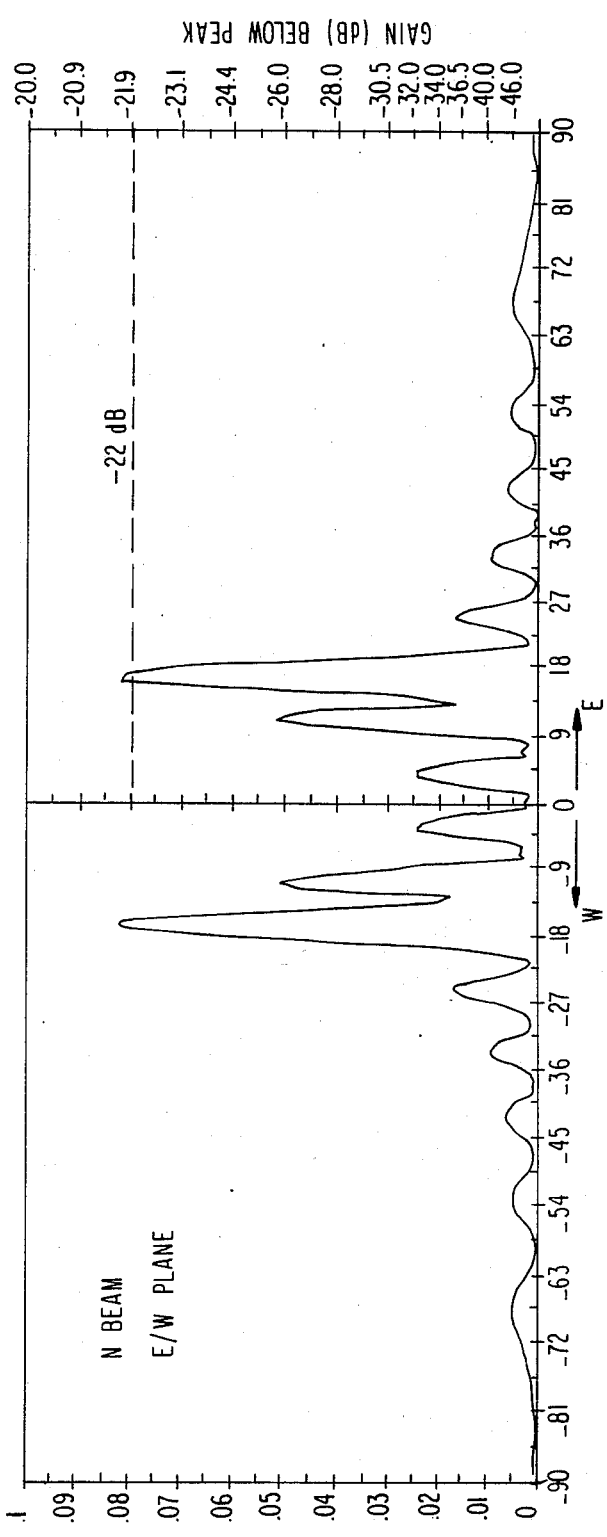
Figure 7C:
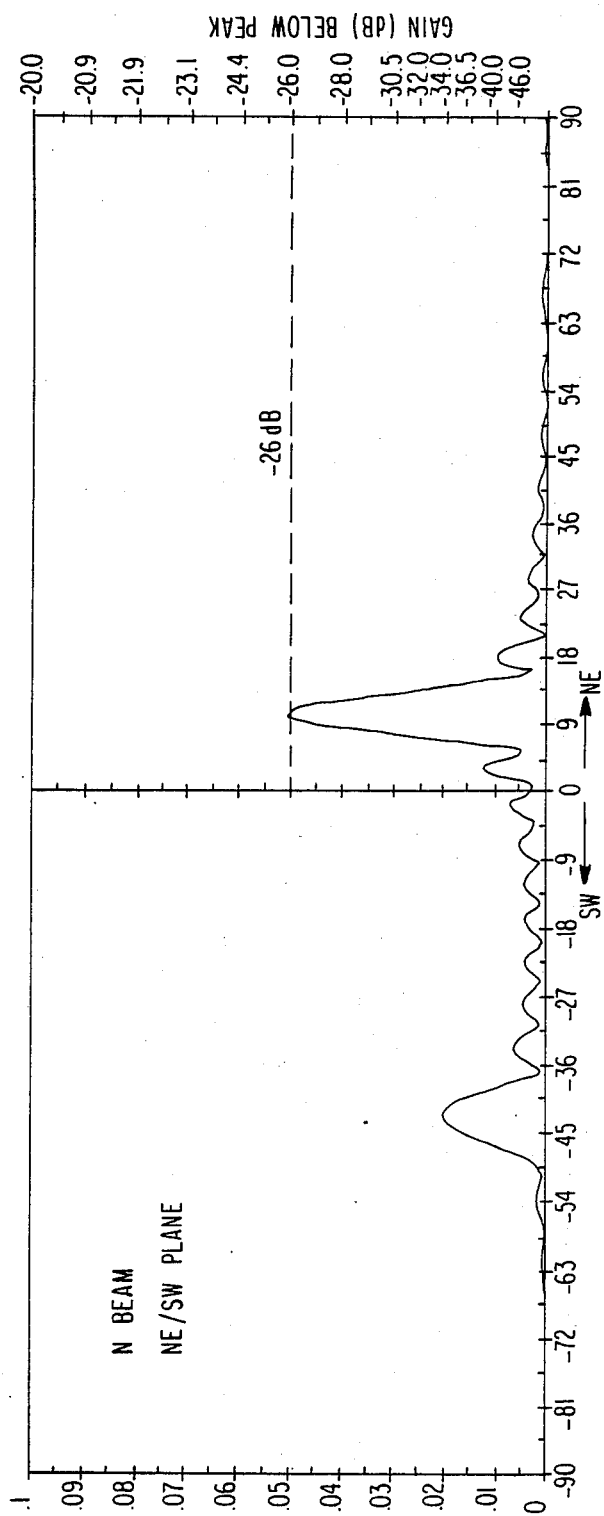
Figure 7D:
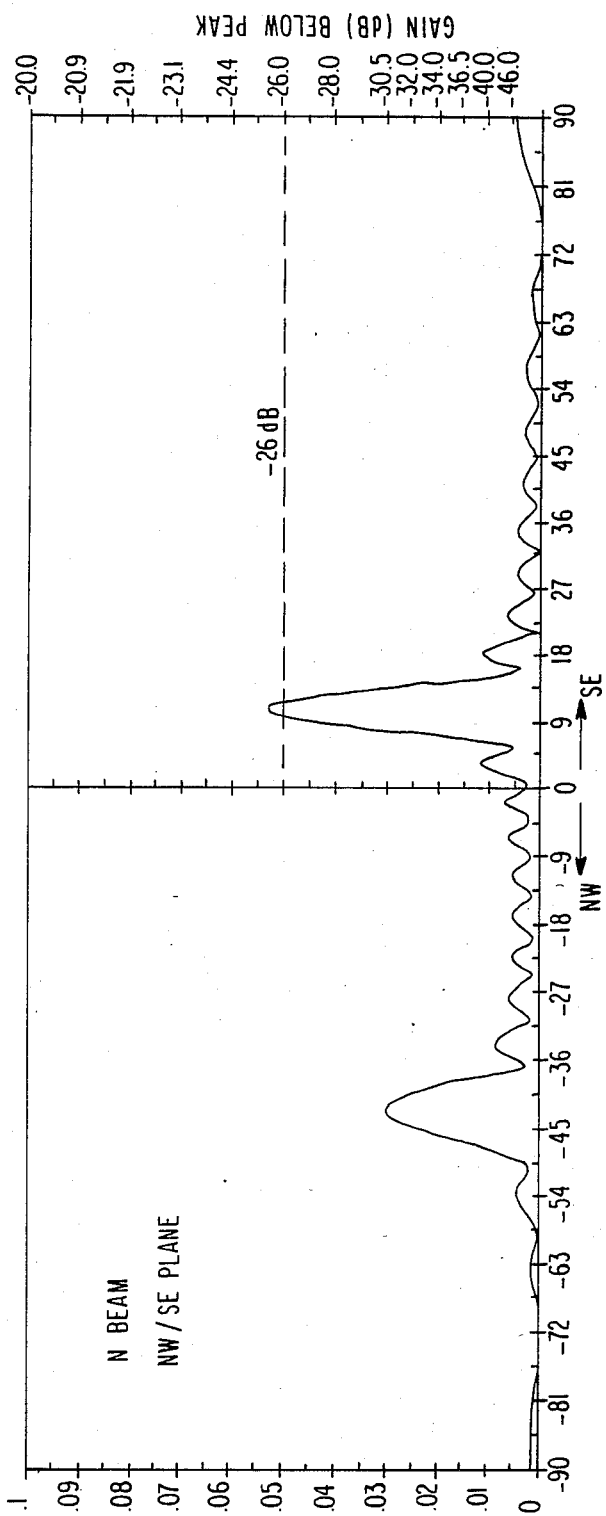

FIGS. 7a through 7b show radiation patterns using the preferred embodiment of the present invention. In FIG. 7a, the radiation pattern for the north-south plane is shown wherein the main beam is displaced 14.5° to the north of zenith. In this case, the transfer switches have been set for the north beam. It is readily seen that the power level with respect to the main beam is very large relative to the side lobes, the upper 10 dB of the main lobe has been deleted in FIG. 7 to facilitate the illustration of the side lobes; FIGS. 7b through 7d show that the side lobes of the radiation pattern for the other points of the compass are relatively low.

The preferred embodiment produces two beams for measuring the profile of horizontal winds. However, measurements of vertical winds, per se, may be needed especially if corrections for vertical velocities are to be applied. These measurements may be made in a number of ways. A separate antenna can be used which is beamed to zenith. Alternatively, additional switching may be incorporated in the phase shifting circuitry such that four beams 15° from zenith to the north, south, east and west are generated. This arrangement, by suitable summing of the wind vectors, provides the vertical winds. Yet another approach is to provide additional switching such that the beams 15° off zenith to the north and east are produced along with one directed to zenith.

Although the invention has been described and shown in terms of a preferred embodiment thereof, it will be understood by those skilled in the art that change in form and details may be made therein without departing from the spirit and scope of the invention.

Having described the invention in terms of a preferred embodiment, I claim:

1. A method for wind profiling comprising the steps of:

arranging individual antenna elements into a polarized array;

positioning the array such that the polarization is 45° from orthogonal first and second principal planes of operation;

phasing the individual antenna elements so that the antenna array generates radiation beams directed in the principal planes;

alternately switching the phasing such that the antenna array directs a beam in the first principal plane and then in the second principal plane;

periodically transmitting at a predetermined frequency a burst of pulses through the antenna array;

receiving reflected pulses between periods of transmission;

measuring the time elapsed between when a pulse is transmitted and when a pulse is received for each beam direction and computing altitude;

determining the frequency difference between the received reflected pulse and the transmitted pulses for each beam direction;

generating wind component vectors using the frequency difference and the beam direction information; and calculating wind direction and speed using the wind component vectors.

* * * * *